US012445086B2

(12) United States Patent
Akhavan-Tafti

(10) Patent No.: US 12,445,086 B2
(45) Date of Patent: Oct. 14, 2025

(54) THREE-DIMENSIONAL PHOTOVOLTAIC CHARGING SYSTEM

(71) Applicant: THE REGENTS OF THE UNIVERSITY OF MICHIGAN, Ann Arbor, MI (US)

(72) Inventor: Mojtaba Akhavan-Tafti, Ann Arbor, MI (US)

(73) Assignee: The Regents of the University of Michigan, Ann Arbor, MI (US)

(*) Notice: Subject to any disclaimer, the term of this patent is extended or adjusted under 35 U.S.C. 154(b) by 0 days.

(21) Appl. No.: 17/408,925

(22) Filed: Aug. 23, 2021

(65) Prior Publication Data

US 2022/0060142 A1 Feb. 24, 2022

Related U.S. Application Data

(60) Provisional application No. 63/069,261, filed on Aug. 24, 2020.

(51) Int. Cl.
*H02S 20/32* (2014.01)
*H02S 30/10* (2014.01)
(Continued)

(52) U.S. Cl.
CPC ............. *H02S 20/32* (2014.12); *H02S 30/10* (2014.12); *H02S 40/22* (2014.12); *H02S 40/38* (2014.12); *H02S 40/42* (2014.12)

(58) Field of Classification Search
CPC ....... H01L 31/00–078; Y02E 10/50–60; H02S 10/00–40; H02S 20/00–32; H02S 30/00–20; H02S 40/00–44
See application file for complete search history.

(56) References Cited

U.S. PATENT DOCUMENTS 4,106,952 A 8/1978 Kravitz
4,224,082 A 9/1980 Jacobson
(Continued)

FOREIGN PATENT DOCUMENTS

BR 9000510 A * 1/1991 ............... E04B 1/74
CN 103384920 A 11/2013
(Continued)

OTHER PUBLICATIONS

CN207701042 English translation (Year: 2018).*
(Continued)

*Primary Examiner* — Bach T Dinh
(74) *Attorney, Agent, or Firm* — Reising Ethington P.C.

(57) ABSTRACT

A compact, three-dimensional (3D) photovoltaic charging system comprising a photovoltaic unit encased in a transparent housing, a power management unit, and a support base. The photovoltaic unit having non-coplanar photovoltaic surfaces that are positioned at a relative distance and a relative orientation. Compared to conventional flat solar panels, the 3D photovoltaic charging system can collect light vertically, therefore amplifying solar module power density, defined as power output per installation footprint area. A photo-tracking, 3D photovoltaic charging system is also described, having a photovoltaic unit encased in a transparent housing, a power management unit, and means to track a source of electromagnetic radiation. The photo-tracking, 3D photovoltaic charging system tracks a moving light source, resulting in improved light flux intake, and therefore, enhanced electric power output.

20 Claims, 5 Drawing Sheets

(51) Int. Cl.
 H02S 40/22 (2014.01)
 H02S 40/38 (2014.01)
 H02S 40/42 (2014.01)

(56) References Cited

U.S. PATENT DOCUMENTS

| | | | |
|---|---|---|---|
| 4,331,829 | A | 5/1982 | Palazzetti et al. |
| 4,338,480 | A | 7/1982 | Antypas et al. |
| 4,441,143 | A | 4/1984 | Richardson, Jr. |
| 4,746,370 | A | 5/1988 | Woolf |
| 5,009,243 | A * | 4/1991 | Barker ............... H01L 31/0504 |
| | | | 136/246 |
| 5,068,865 | A | 11/1991 | Ohshima et al. |
| 5,110,368 | A | 5/1992 | Otto et al. |
| 6,060,658 | A * | 5/2000 | Yoshida ............... G09F 27/007 |
| | | | 52/173.3 |
| 6,087,579 | A | 7/2000 | Muskatevc |
| 6,223,675 | B1 | 5/2001 | Watt et al. |
| 7,797,939 | B2 | 9/2010 | Green |
| 8,146,527 | B2 | 4/2012 | Pellen |
| 8,553,742 | B1 | 10/2013 | Wu |
| 8,664,514 | B2 | 3/2014 | Watters |
| 8,787,420 | B2 | 7/2014 | Kimoto et al. |
| 8,860,165 | B2 | 10/2014 | Okaniwa et al. |
| 8,963,704 | B2 | 2/2015 | Adami |
| 9,048,609 | B2 | 6/2015 | Kim |
| 9,059,558 | B2 | 6/2015 | Zhu et al. |
| 9,158,178 | B2 | 10/2015 | Smeeton et al. |
| 9,172,207 | B2 | 10/2015 | Chen |
| 9,180,551 | B2 | 11/2015 | Paganelli |
| 9,203,212 | B2 | 12/2015 | Kurobe et al. |
| 9,592,742 | B1 | 3/2017 | Sosinov et al. |
| 10,027,412 | B2 | 7/2018 | Eroglu et al. |
| 11,145,046 | B2 | 10/2021 | Lakshmanan et al. |
| 11,245,469 | B2 | 2/2022 | Lakshmanan et al. |
| 2004/0149988 | A1 | 8/2004 | Shiozaki et al. |
| 2006/0266407 | A1 | 11/2006 | Lichy et al. |
| 2007/0012353 | A1 | 1/2007 | Fischer et al. |
| 2008/0000518 | A1 | 1/2008 | Basol |
| 2008/0245401 | A1 | 10/2008 | Winston et al. |
| 2008/0289682 | A1 | 11/2008 | Adriani et al. |
| 2009/0009847 | A1 | 1/2009 | Sasagawa et al. |
| 2009/0040750 | A1 | 2/2009 | Myer |
| 2009/0272424 | A1 | 11/2009 | Ortabasi |
| 2009/0272425 | A1 | 11/2009 | Green |
| 2010/0089436 | A1 | 4/2010 | Watters |
| 2010/0212717 | A1 | 8/2010 | Whitlock et al. |
| 2010/0236609 | A1 | 9/2010 | Tweedie |
| 2011/0017256 | A1 | 1/2011 | Stevens |
| 2011/0056534 | A1 | 3/2011 | Ding et al. |
| 2011/0061717 | A1 | 3/2011 | Kwon et al. |
| 2011/0232211 | A1 | 9/2011 | Farahi |
| 2011/0278440 | A1 | 11/2011 | Chan et al. |
| 2011/0290296 | A1 | 12/2011 | Daniel et al. |
| 2011/0305010 | A1 | 12/2011 | Leadford et al. |
| 2012/0031018 | A1 * | 2/2012 | Kapany ............... F24S 20/63 |
| | | | 136/246 |
| 2012/0080078 | A1 | 4/2012 | Farrelly et al. |
| 2012/0118359 | A1 | 5/2012 | Battistutti |
| 2012/0240982 | A1 | 9/2012 | Corneille |
| 2013/0038919 | A1 | 2/2013 | Gibson et al. |
| 2013/0112239 | A1 | 5/2013 | Liptac et al. |
| 2013/0174896 | A1 | 7/2013 | Ardo et al. |
| 2013/0192656 | A1 | 8/2013 | Hardin et al. |
| 2013/0192662 | A1 * | 8/2013 | Snidow ............... H01L 31/042 |
| | | | 136/246 |
| 2013/0200709 | A1 | 8/2013 | Kirchner et al. |
| 2013/0346166 | A1 | 12/2013 | Chihara |
| 2014/0130851 | A1 | 5/2014 | Osamura et al. |
| 2015/0034147 | A1 | 2/2015 | Le Perchec et al. |
| 2015/0101761 | A1 * | 4/2015 | Moslehi ............... E06B 9/386 |
| | | | 160/107 |
| 2015/0144191 | A1 | 5/2015 | Declerck et al. |
| 2015/0336669 | A1 | 11/2015 | Kantor et al. |
| 2016/0049799 | A1 | 2/2016 | Takatsu et al. |
| 2016/0145934 | A1 * | 5/2016 | Trott ............... E06B 3/26 |
| | | | 52/203 |
| 2016/0254781 | A1 | 9/2016 | Pisharodi |
| 2017/0077867 | A1 | 3/2017 | Hohulin |
| 2017/0170776 | A1 * | 6/2017 | Janowski ............... H02S 20/26 |
| 2017/0174092 | A1 | 6/2017 | Kohnke |
| 2018/0076758 | A1 * | 3/2018 | Miranda ............... H02S 20/10 |
| 2019/0252565 | A1 * | 8/2019 | Lyons ............... H02S 20/22 |
| 2019/0323733 | A1 | 10/2019 | Lv |
| 2020/0177026 | A1 | 6/2020 | Sosinov et al. |
| 2022/0060142 | A1 | 2/2022 | Akhavan-Tafti |
| 2022/0379762 | A1 | 12/2022 | Akhavan-Tafti |

FOREIGN PATENT DOCUMENTS

| | | | |
|---|---|---|---|
| CN | 207701042 | * | 8/2018 |
| GB | 2479024 | A | 9/2011 |
| JP | 3220934 | B2 | 10/2001 |
| JP | 2003346521 | A | 12/2003 |
| JP | 2013225644 | A | 10/2013 |
| JP | 2017127040 | A | 7/2017 |
| JP | 6376732 | B2 | 8/2018 |
| KR | 10-2010-0027379 | A | 3/2010 |
| KR | 100973774 | B1 | 8/2010 |
| KR | 20120013745 | A | 2/2012 |
| KR | 20140028179 | A | 3/2014 |
| KR | 20160015716 | A | 2/2016 |
| KR | 20160043902 | A | 4/2016 |
| KR | 20160133838 | A | 11/2016 |
| KR | 20160142014 | * | 12/2016 |
| KR | 20160142014 | A | 12/2016 |
| KR | 20170024300 | A | 3/2017 |
| KR | 20190118689 | A | 10/2019 |
| WO | 2012/166048 | A1 | 12/2012 |
| WO | 2012/173350 | A2 | 12/2012 |
| WO | 2015-009482 | A2 | 1/2015 |
| WO | 2015196296 | A1 | 12/2015 |
| WO | 2016187328 | A1 | 11/2016 |
| WO | 2017-097772 | A1 | 6/2017 |

OTHER PUBLICATIONS

BR9000510 translation (Year: 1991).*
KR20160142014 English (Year: 2016).*
International Search Report and Written Opinion of the International Searching Authority regarding International Patent Application No. PCT/US2022/016614, dated May 31, 2022.
International Search Report and Written Opinion mailed Apr. 29, 2020 regarding PCT/US2019/026580.
International Search Report and Written Opinion of the International Searching Authority issued in PCT/US2018/049880, mailed Nov. 21, 2018; ISA/US.
"3M Ultra Barrier Solar Film 510-F." 3M™ Ultra Barrier Solar Film 510-F, 3M, Oct. 2016, https://multimedia.3m.com/mws/media/12854700/3m-ultra-barrier-solar-film-510-f.pdf. (Year: 2016).
Liu, Ji-Tao, et al. "Curing Determination of EVA for Solar Panel Application by DSC."Curing Determination of EVA for Solar Panel Application, PerkinElmer, Inc, 2010, https://www.s4science.at/wordpress/wp-content/uploads/2018/10/EVA-Curing-for-Solar-Panels_DSC8000_APP .pdf. (Year: 2010).
Tomoyoshi Motohiro et al., "Concept of the solar-pumped laser-photovoltaics combined system and its application to laser beam power feeding to electric vehicles", Japanese Journal of Applied Physics, 2017.
International Search Report and Written Opinion of the International Searching Authority issued in PCT/US2020/059262, mailed Feb. 26, 2021, ISA/US.
International Search Report regarding International Application No. PCT/US2021/047268 Dated Dec. 21, 2021.
D.-R. Kim, S.-H. Yang, H.-S. Kim, Y.-H. Son, and S.-K. Han, "Outdoor Visible Light Communication for inter-vehicle communication using Controller Area Network," in 2012 Fourth International Conference on Communications and Electronics (ICCE), Hue, Vietnam, Aug. 2012, pp. 31-34. doi: 10.1109/CCE.2012.6315865.

(56) References Cited

OTHER PUBLICATIONS

Wang, Yiguang, Xingxing Huang, Jianyang Shi, Yuan-quan Wang, and Nan Chi. "Long-Range High-Speed Visible Light Communication System over 100-m Outdoor Transmission Utilizing Receiver Diversity Technology." Optical Engineering 55, No. 5 (May 2016): 056104.

Kim, Yong Hyeon, Willy Anugrah Cahyadi, and Yeon Ho Chung. "Experimental Demonstration of VLC-Based Vehicle-to-Vehicle Communications Under Fog Conditions." IEEE Photonics Journal 7, No. 6 (Dec. 2015): 1-9.

Rodriguez, Juan, Diego G. Lamar, Daniel G. Aller, Pablo F. Miaja, and Javier Sebastian. "Efficient Visible Light Communication Transmitters Based on Switching-Mode Dc-Dc Converters." Sensors 18, No. 4 (Apr. 2018): 1127.

Vega-Colado, Cesar, Belen Arredondo, Juan Carlos Torres, Eduardo Lopez-Fraguas, Ricardo Vergaz, Diego Martin-Martin, Gonzalo Del Pozo, et al. "An All-Organic Flexible Visible Light Communication System." Sensors 18, No. 9 (Sep. 2018): 3045.

Gordon Povey, "An IEEE Standard For Visible Light Communications", Visible Light Communications, Apr. 7, 2011.

"Shedding Light on LiFi", Pure LiFi, Aug. 2017.

"Deok Rae Kim et al., ""Outdoor Visible Light Communication For Inter-Vehicle Communication Using Control Area Network""", ICCE, 2012 (pp. 31-34).".

Harald Haas, "LiFi is a Paradigm-Shifting 5G Technology", Reviews in Physics, Oct. 27, 2017.

Mohamed Sufyan Islim et al., "The Impact of Solar Irradiance on Visible Light Communications", Journal of Lightwave Technology, vol. 36, No. 12, Jun. 15, 2018.

Saeed Ur Rehman et al., "Visible Light Communication: A System Perspective—Overview and Challenges", Sensors, Mar. 7, 2019.

Bugra Turan et al., "Vehicular Visible Light Communications", Intech, 2017.

Alin-Mihai Cailean et al.,"A Survey on the Usage of DSRC and VLC in Communication-Based Vehicle Safety Applications", IEEE, 2014.

Cen Liu, "Enabling Vehicular Visible Light Communication (V2LC) Networks", VANET' 11, Sep. 23, 2011.

Arnez Pramesti Ardi et al., "VLC-Based Car-to-Car Communication", Jurnal Elecktronika dan Telekomunikasi (JET), vol. 20, No. 1, Aug. 2020, pp. 16-22.

Trong-Hop Do et al., "Potentialities and Challenges of VLC Based Outdoor Positioning", IEEE, 2015.

Hossien B. Eldeeb et al., "Vehicle-to-Vehicle Light Communication: How to Select Receiver Locations for Optimal Performance", IEEE.

Mohammed Elamassie et at., "Effect of Fog and Rain on the Performance of Vehicular Visible Light Communications", IEEE, 2018.

Hossien B. Eldeeb et al., "MAC Layer Performance of Multi-Hop Vehicular VLC Networks with CSMA/CA", 12th International Symposium on Communication Systems, Networks and Digital Signal Processing, 2020.

Harald Haas et al., "What is LiFi?", Journal of Lightwave Technology, IEEE, 2015.

Harald Haas et al., "Introduction to Indoor Networking Concepts and Challenges in LiFi", Journal of Optical Communications and Networking, vol. 12, No. 2, Feb. 2020.

Pable Palacios Jativa et al., "Performance Analysis of OFDM-Based VLC Schemes in NLOS Channels", IEEE, Downloaded May 16, 2021.

S. Sivaguru,"A High Speen Open Access Visible Light Communication System Based on Intensity Modulation", International Journal of Science Technology & Engineering, vol. 3, Issue 08, Feb. 2017.

Rahul R. Sharma et al., "Implementation of a Simple Li-Fi Based System", International Journal of Computing and Technology, vol. 1, Issue 9, Oct. 2014.

Tahmid H. Talukdar et al., "Small Scale Wireless Data Transmission via Light Using Light Source", Proceedings of the International Conference on Engineering Research, Innovation, and Education 2017.

Soumyajit Chatterjee, "Point-to-Point Digital Communication using VLC (Visible Light Communication) and LiFi Technology", IEEE.

Chinese Office Action regarding Patent Application No. 2018800722004, dated Mar. 7, 2023.

Chinese Office Action regarding Patent Application No. 201880072200.4, dated Sep. 21, 2023.

Extended European Search Report regarding Patent Application No. 20884793.9, dated Oct. 16, 2023.

International Search Report and Written Opinion of the ISA issued in PCT/US2023/029454, mailed Nov. 21, 2023; ISA/US.

Chinese Office Action regarding Patent Application No. 201880072200.4, dated Feb. 22, 2024.

Chinese Office Action regarding Patent Application No. 201880072200.4, dated Jul. 1, 2024.

Extended European Search Report regarding EP Application No. 21862535 dated Jul. 26, 2024.

German Office Action regarding Patent Application No. 112018004929.9, dated Sep. 19, 2024.

Japanese Office Action corresponding to application 2023-513459, dated Jun. 26, 2025, 11 pages.

\* cited by examiner

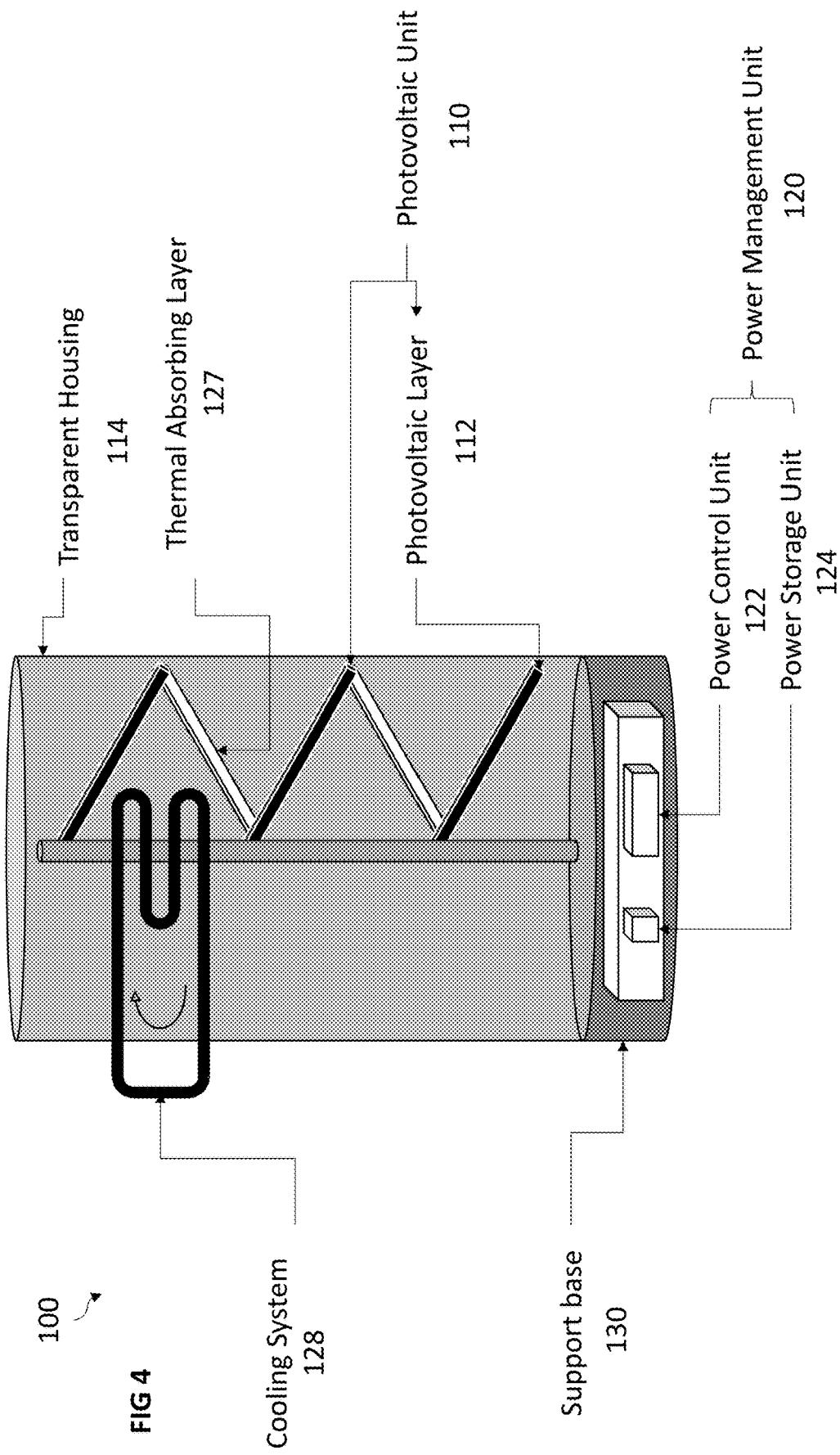

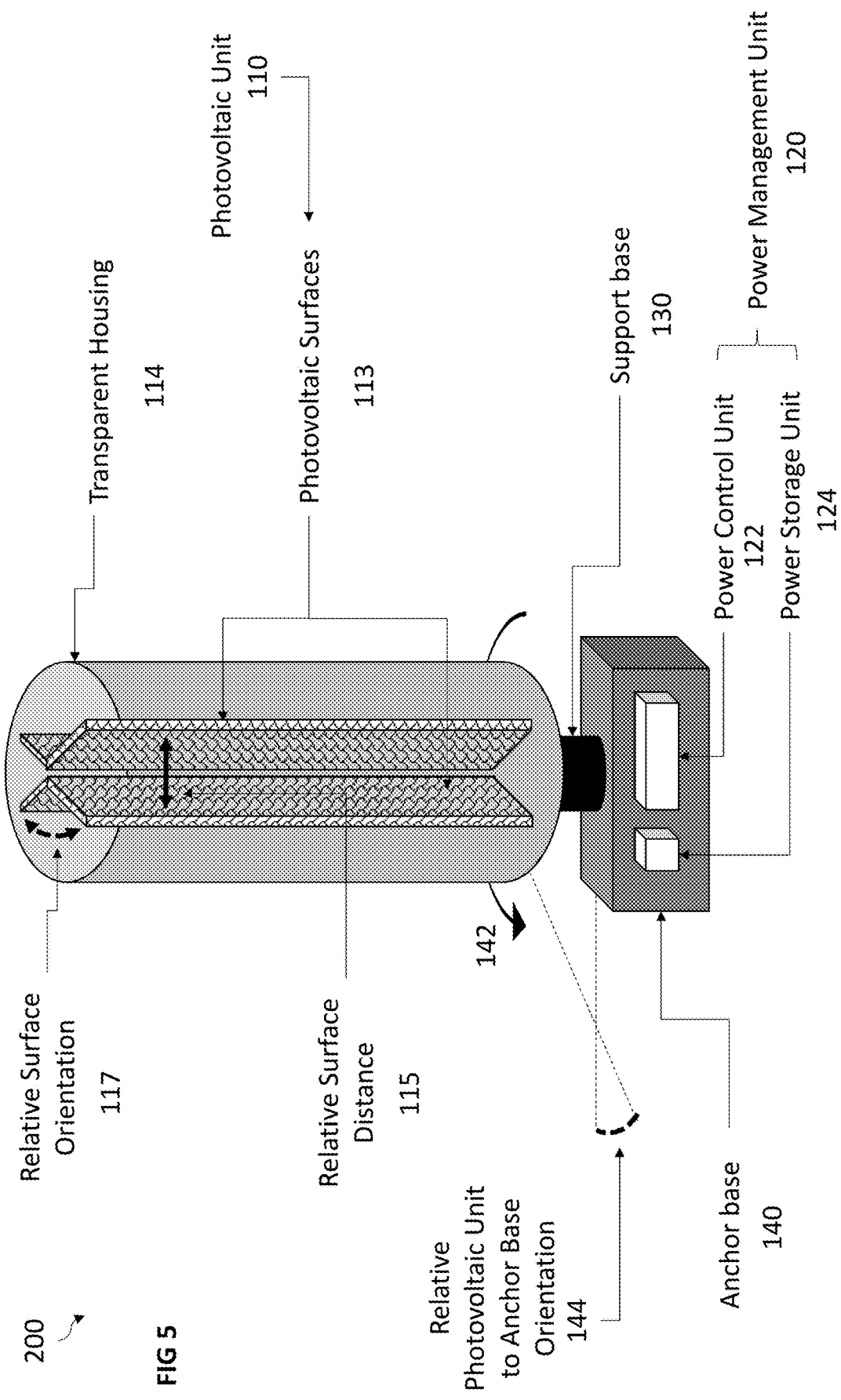

THREE-DIMENSIONAL PHOTOVOLTAIC CHARGING SYSTEM

CROSS-REFERENCE TO RELATED APPLICATIONS

This application claims the benefit of U.S. Provisional Application No. 63/069,261, filed on Aug. 24, 2020. The entire disclosure of the above application is incorporated herein by reference.

FIELD

The present disclosure relates to photovoltaic modules and, more particularly, to a device to improve power density of photovoltaic modules for powering electric devices.

BACKGROUND AND SUMMARY

This section provides background information related to the present disclosure which is not necessarily prior art. This section provides a general summary of the disclosure, and is not a comprehensive disclosure of its full scope or all of its features.

Solar power is more affordable, accessible, and prevalent in the United States than ever before. The United States Office of Energy Efficiency and Renewable Energy reported that since 2008, U.S. installations have grown 35-fold to an estimated 62.5 gigawatts (GW) today. This is enough capacity to power the equivalent of 12 million average American homes. Since the beginning of 2014, the average cost of solar photovoltaic (PV) panels has dropped nearly 50%. Solar electricity is now economically competitive, overcoming coal electricity in early 2020, with conventional energy sources in several states, including California, Hawaii, and Minnesota. Moreover, the solar industry is a proven incubator for economic growth throughout the nation and the world, especially in developing regions.

Increased solar energy deployment offers myriad benefits for the United States. Solar's abundance and potential throughout the United States is staggering: PV panels on just 0.6% of the nation's total land area could supply enough electricity to power the entire United States, as declared by the U.S. Department of Energy.

Despite this impressive progress, significant work remains before solar becomes as affordable as conventional energy sources and meets its full potential throughout the country. Solar hardware costs have fallen dramatically, but market barriers and grid integration challenges continue to hinder greater deployment. The U.S. National Renewable Energy Laboratory concluded that non-hardware solar "soft costs"—such as permitting, financing, and land & customer acquisition—are becoming an increasingly larger fraction of the total cost of solar and now constitute up to 74% of the cost of a residential system. Technological advances and innovative solutions are still needed to increase efficiency, drive down costs, and enable utilities to rely on solar for baseload power.

PV can be installed on rooftops with essentially no land use impacts. However, in the United States, only 26% of the total rooftop area on small buildings is oriented suitably for PV deployment, a fraction of which lacks the essential structural integrity for the increased load. Higher power density solar modules will enable rooftop load reduction. Deployable, high power density solar modules can be installed off residential rooftops, on backyards, along sidewalks, etc., to avoid rooftop installation costs altogether, without compromising valuable real estate. The present teachings provide a compact and high power density solar module design to address these unmet needs.

Three-dimensional (3D) solar modules, as described in commonly-assigned International Application No. PCT/US2018/049880 entitled Electromagnetic Energy Converter and incorporated herein by reference, aim to improve the power density of solar modules, and therefore, drive down the soft cost of solar electricity.

Unlike conventional flat solar panels, 3D solar modules can collect and convert light from various directions, especially photons reflected from the surrounding and/or adjacent photovoltaic cells, especially in the case of passivated emitter and rear contact cells. More importantly, 3D solar modules can collect light vertically, thus lowering installation footprint while maintaining power output. Therefore, 3D solar modules have higher power density, defined as power output per installation footprint in units of watts per meter squared, than conventional flat solar panels.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 illustrates a schematic of a 3D photovoltaic charging system, comprising a photovoltaic unit having a plurality of photovoltaic layers encased in a transparent housing, a power management unit having a control unit, and a support base. Electric current generated from light converted into electricity is delivered to the power management unit via a cable housed within an electric conduit. The power control unit is coupled with other electric devices, consumers or generators, via a physical and/or virtual electrical connection.

FIG. 4 illustrates a schematic of a 3D photovoltaic charging system, comprising a photovoltaic unit having a plurality of photovoltaic layers encased in a transparent housing, a power management unit having a power storage unit and a control unit, a support base. The transparent housing further comprises thermal absorbing layers and a circulation cooling system.

FIG. 5 illustrates a schematic of a photo-tracking, 3D photovoltaic charging system, comprising a photovoltaic unit having a plurality of photovoltaic layers encased in a transparent housing, a power management unit having a power storage unit and a control unit, a support base, and an anchor base.

DETAILED DESCRIPTION

Figure 1:
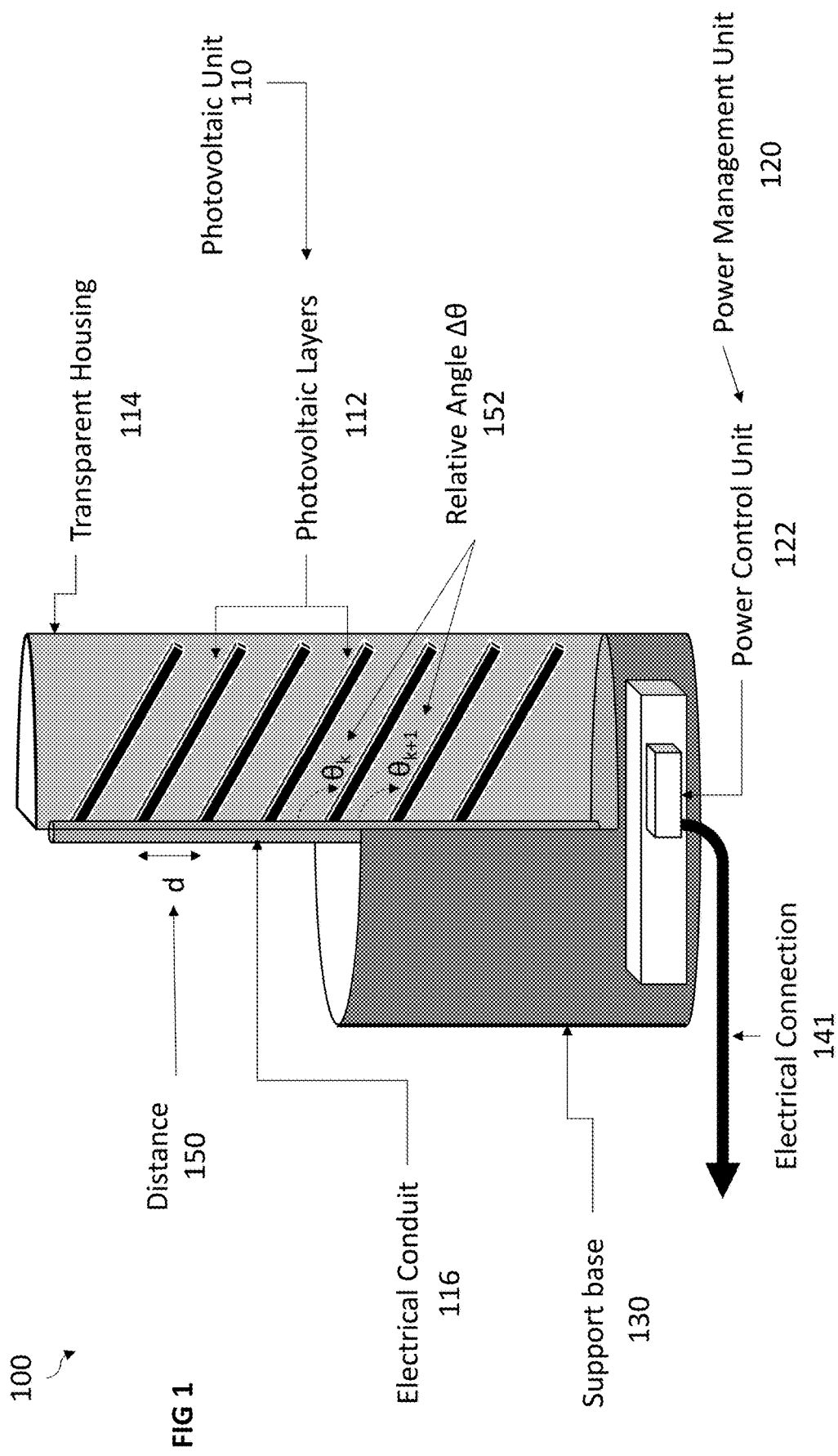

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
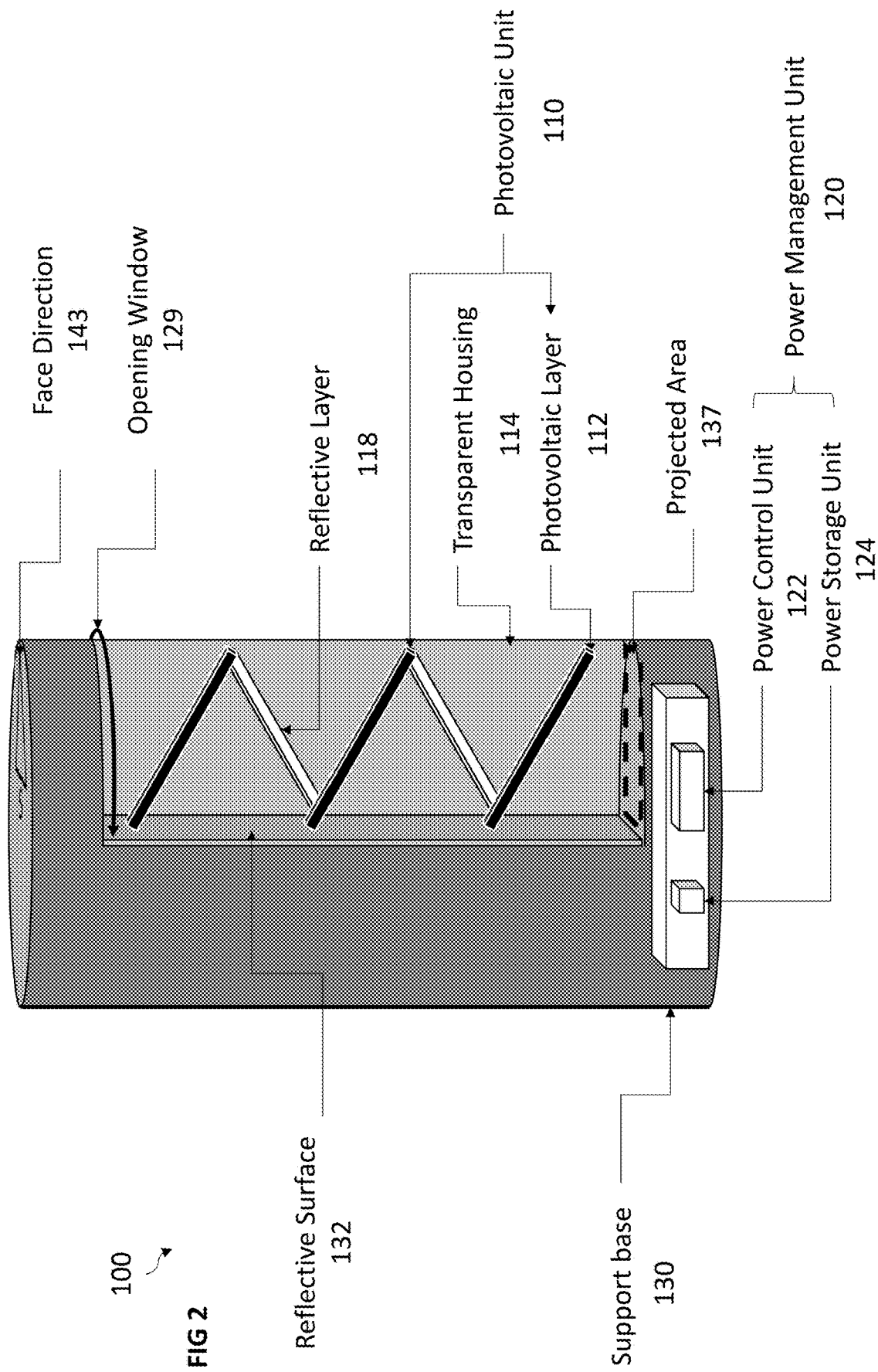
FIG. 2 illustrates a schematic of a 3D photovoltaic charging system, comprising a photovoltaic unit having a plurality of photovoltaic and reflective layers encased in a transparent housing, a power management unit having a power storage unit and a control unit, and a support base.
Figure 3:
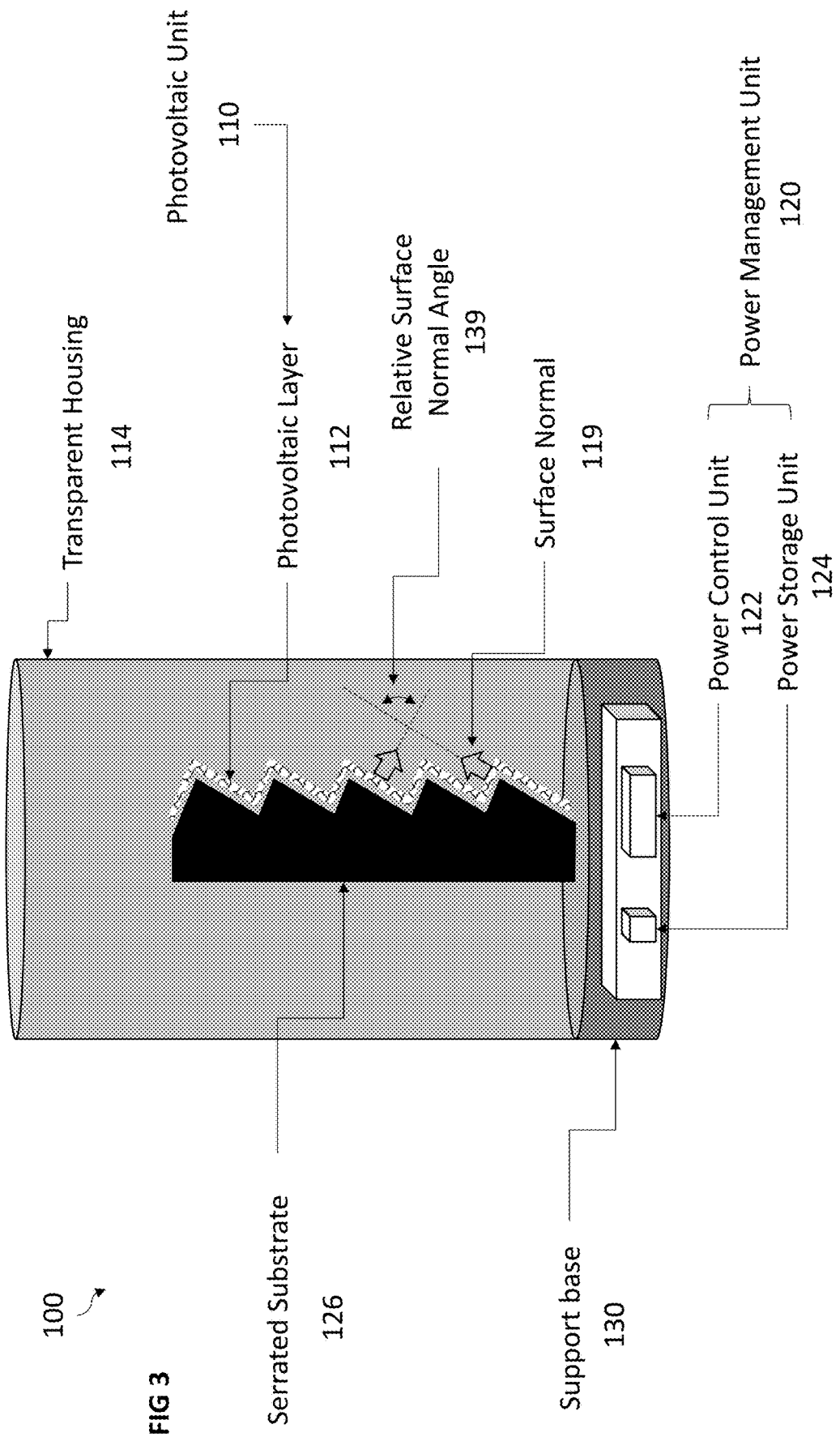
FIG. 3 illustrates a schematic of a 3D photovoltaic charging system, comprising a substrate with a serrated surface covered with a uniform photovoltaic layer encased in a transparent housing, a power management unit having a power storage unit and a control unit, and a support base.

According to the principles of the present teachings, and with reference to FIGS. 1-3, a three-dimensional (3D) photovoltaic charging system 100 is provided having advantageous construction and method of use. In some embodiments, 3D photovoltaic charging system 100 can comprise a photovoltaic unit 110 having a plurality of discrete and non-coplanar photovoltaic layers 112. In some embodiments, the photovoltaic layer is a photovoltaic cell, such as a mono or poly-crystalline solar cell.

In some embodiments, a three-dimensional photovoltaic charging system 100 comprising a photovoltaic unit 110 comprising a plurality of discrete and non-coplanar photovoltaic layers 112 configured to convert light to electric current, a distance 150 and a relative angle 152 between adjacent layers of the plurality of discrete and non-coplanar photovoltaic layers 112, a power management unit 120 comprising a power control unit 122, the power management unit 120 configured to receive and manage the electric current from the plurality of discrete and non-coplanar photovoltaic layers 112, a support base 130 receiving the photovoltaic unit 110 and the power management unit 120, and an at least partially transparent housing 114 at least partially insulating the plurality of discrete and non-coplanar photovoltaic layers 112.

In some embodiments, the plurality of photovoltaic layers 112 are separated at a distance 150 greater than 1 nanometer. The distance 150 refers to the separation between adjacent photovoltaic layers 112. The distance between adjacent photovoltaic layers 112 can be adjusted for optimal power output per unit length. Adjacent photovoltaic layers 112 can also be inclined at a relative angle 152 ranging from 0 to 360 degrees. The relative angle 152 refers to the difference in angles of adjacent photovoltaic layers 112 from zenith. For instance, the relative angle 152 between two parallel zenith-facing solar cells stacked on top of each other at a distance 150 is 0 degrees. Similarly, the relative angle 152 between two vertically-stacked solar cells facing in opposite directions (one facing toward zenith or PV-side up, and the other facing away from zenith or PV-side down) is 180 degrees. In the latter embodiment, the adjacent photovoltaic layers 112 are either facing each other, face-to-face, or positioned to face away from each other, i.e., back-to-back. In the case of bifacial solar cells, the cell can be characterized with two complementary angles, each identifying one of the two faces.

In some embodiments, 3D photovoltaic charging system 100 can further comprise a power management unit 120 having a power control unit 122. The power control unit 122 is configured to manage and control elements and operation of 3D photovoltaic charging system 100. In some embodiments, the power control unit 122 comprises a maximum power point tracking (MPPT) controller. In some embodiments, the power control unit 122 comprises a pulse width modulation (PWM) controller.

In some embodiments, the power management unit 120 further comprises a power storage unit 124 for receiving and storing power produced. In some embodiments, the power control unit 122 serves to connect a plurality of photovoltaic units 110. In some embodiments, the power control unit 122 serves to manage a plurality of 3D photovoltaic charging systems 100 and/or electric consumers coupled via a physical or virtual electrical connection 141. In some embodiments, the power control unit 122 connects one or a plurality of photovoltaic units 110 to a power grid. In some embodiments, the power control unit 122 comprises a battery management system (BMS).

In some embodiments, a support base 130 receives and/or contains the photovoltaic unit 110 and/or the power management unit 120. In some embodiments, the plurality of photovoltaic layers 112 is insulated in a transparent housing 114 and the plurality of photovoltaic layers convert light to electric current, whereby the electric current is received and managed by the power management unit 120.

In some embodiments, the support base 130 is selected from a group consisting of mounting pole, post, concrete foundation, bollard, anchor, frame, mounting bracket, clamp, rail, magnetic plate, rope, chain, wire, cable, arms, legs, hook, mast, hanger, strut, mounting fastener, wall mount, and belt.

In some embodiments, 3D photovoltaic charging system 100 comprises a photovoltaic unit 110 having ten photovoltaic layers 112, in this case commercial polycrystalline solar cells, vertically stacked on top of each other at a distance 150 of adjacent cells of 0.1 ft at a 30-degree angle from zenith, i.e., relative angle 152 of 0 degrees, and encased in a transparent polycarbonate tube housing 114 with a reflective back surface. In some embodiments, the backside of each individual solar cell is covered with reflective layer 118, in this case a reflective tape, to reduce light absorption and enhance light reflection. In some embodiments, the solar cells are connected in series. The photovoltaic unit 110 comprising the plurality of photovoltaic layers 112. The photovoltaic unit 110 can be encased in a transparent housing 114 positioned inside a 3 inch-diameter polyvinyl chloride (PVC) pipe support base 130 with an opening window 129. The photovoltaic unit 110 receives light through the opening window 129. The projected area 137 of the photovoltaic unit 110 is 1000 mm$^2$.

The opening window 129 of the PVC support base 130 containing the photovoltaic unit 110 was positioned exposed to the Summer (June 2020) sun at a fixed face direction 143 pointing South in Ann Arbor, MI. The output of the 3D photovoltaic charging system was measured at various load resistances. The output of a reference photovoltaic layer 112, in this case one polycrystalline solar cell fixed at a 45-degree angle from horizon 'facing' South, was also measured. The output of the 3D photovoltaic charging system 100 was found to reach 330 watts per meter squared (average sunlight intensity at Earth 1000 W/m$^2$), compared to an output of 30 W/m$^2$ measured from the one fixed reference photovoltaic layer 112.

The installation of a plurality of photovoltaic layers 112 stacked on top of each other at a distance 150 results in a projected area 137 that is equal to that of individual photovoltaic layers 112. This indicated that the 3D photovoltaic charging system 100, in this case of only one-foot height, generated ten times the power density of the fixed reference photovoltaic layer 112. In other words, this embodiment generated 330 W/m$^2$ per foot height. For comparison, a typical street light post is 6 to 14 feet tall and can significantly improve the power density of solar modules by collecting and converting light vertically resulting in enhanced power output with a small footprint.

In some embodiments, a 3D photovoltaic charging system 100 provides power to off-the-power grid lighting, charging, communication, chemical reactor, and internet of things (IoT) systems.

Recently, the solar industry has adopted a bifacial flat solar panels to take advantage of reflected light from the surrounding environment. As a result, the output of bifacial solar panels remains strongly dependent on the properties of the surrounding environment. This dependence translates into requiring reflective surfaces at bifacial solar installations, such as concrete or painted flooring, further driving up the installation costs. While these similar environmental features can also be used to improve the power output of the 3D photovoltaic charging system 100, in some embodiments, they are unnecessary.

The term 'discrete and non-coplanar photovoltaic layers 112' does not include planar configuration of photovoltaic layers 112, such as flat solar panels, bifacial solar panels, flexible solar panels, and tandem solar cells. Bifacial solar panels consist of two-faced solar cells installed in a planar geometry. Flexible solar panels consist of solar cells printed on and supported by a planar and flexible surface. Tandem solar cells consist of a multitude of photovoltaic layers stacked vertically to selectively convert various light frequencies. For the purposes of this application, a tandem solar cell is considered as one 'photovoltaic layer 112.'

The term 'discrete and non-coplanar photovoltaic layers' does not refer to surfaces sprayed and/or printed by a photovoltaic material. A surface printed by a photovoltaic film is considered as one discrete photovoltaic layer 112.

The term 'transparent' refers to materials whose light transmission ratio is greater than zero. Transparency in this context is defined as the physical property of allowing electromagnetic energy to propagate within a material, at least partially or in entirety of the electromagnetic spectrum, with or without appreciable scattering. In some embodiments, the transparent housing 114 is a transparent cover to insulate the photovoltaic layers 112. In some embodiments, the photovoltaic layers 112 are positioned inside a light post with an opening window 137 carved out of the light post. In some embodiments, the transparent housing 114 is a transparent access gate, such as a non-glare acrylic covering, that insulates photovoltaic layers 112. The transparent housing 114 provides light entry and also, in some embodiments, blocks the exposure of photovoltaic layers 112 to environmental damages, including humidity, dew, hail, dust, wind, or even vandalism.

In some embodiments, the transparent housing 114 is a transparent molded slab encasing, at least partially, the photovoltaic layers 112, for improved structural strength. In some embodiments, the transparent housing 114 is vacuumed for insulation. In some embodiments, the transparent housing 114 is filled with a dielectric material, such an inert gas, for insulation to reduce photovoltaic layer 112 corrosion rate, thermal conductivity, and/or electric conductivity.

In some embodiments, the plurality of discrete and non-coplanar photovoltaic layers 112 is at least partially encased in a molded dielectric slab. In some embodiments, the distance between adjacent layers of the plurality of discrete and non-coplanar photovoltaic layers is at least partially filled with a material selected from a group consisting of light-reflective materials, dielectric materials, electrical conductors, thermal conductors, light-transmissive materials, light-absorptive materials, light concentrators, light-diffusive materials, gels, pastes, liquids, oils, water, resins, polymers, thermal-setting polymers, photo-setting polymers, thermal coolant, heat-absorbing materials, heat-dispersing materials, air packets, light-emitting materials, electroluminescent materials, and photoluminescent materials.

In some embodiments, the 3D photovoltaic charging system 100 comprises a photovoltaic unit 110 having a plurality of non-coplanar photovoltaic layers 112 encased in a transparent housing 114 and a reflective surface 132. The photovoltaic unit is installed on a support base 130, for instance a street light post, by a fastener. In some embodiments, the fastener can be an adjustable belt that affixes the photovoltaic unit 110 along the outer surface of the light post. In some embodiments, the power management unit 120 is housed inside the light post to provide power for lighting. In some embodiments, the support base 130 is an electric device, such as but not limited to phone chargers, electric scooters, electric bike charger station, and a smart traffic monitor. In some embodiments, the 3D photovoltaic charging system 100 is integrated into and provides power to outdoor configurable or mosaic hardware, such as an assembly of sensors.

In some embodiments, the support base 130 is the floor and/or ground on which the 3D photovoltaic charging system 100 rests. In some embodiments, the transparent housing 114 also houses the power management system 120, and therefore, serves as the support base 130. In some embodiments, the support base 130 is an electric post, which can facilitate power grid connection.

In some embodiments, the electricity generated by the photovoltaic unit 110 is delivered to the power management unit 120 via wires housed in an electric conduit 116. The electric conduit 116 can also be used as a support base 130. In some embodiments, the electric conduit 116 is coated with a reflective material.

In some embodiments, the individual photovoltaic layers 112 of the photovoltaic unit 110 are replaceable. In some embodiments, the photovoltaic layers 112 are pulled out of a transparent, hardened resin molded slab, dielectric gel, or coolant fluid for inspection or replacement.

In some embodiments, the 3D photovoltaic charging system 100 comprises a plurality of photovoltaic units 110 encased in interlocking transparent housings 114, individually referred to as 3D solar blocks, to create a solar mat. In some embodiments, the 3D photovoltaic charging system 100 comprises a plurality of photovoltaic layers 112, each photovoltaic layer 112 encased individually in a transparent housing. A plurality of individually encased photovoltaic layers 112 are coupled into a photovoltaic unit 110. In some embodiments, the photovoltaic unit 110 further comprises of individually encased reflective layers 118. In some embodiments, the 3D solar block comprises at least a pair of a photovoltaic layer 112 and reflective layers 118 encased in a transparent housing. The 3D solar mat is installed horizontally or vertically. In some cases, a support base 130, such as a wall mount, is used. In some embodiments, individual 3D solar blocks are replaceable. In some embodiments, a plurality of photovoltaic layers 112, a photovoltaic unit 110, are encased in a transparent housing 114 to create a 3D solar panel.

In some embodiments, reflective layers 118 are distributed between photovoltaic layers 112. In some embodiments, photovoltaic layers 112 and reflective layers 118 are oriented at an angle. The angle between the photovoltaic layers 112 and the reflective layers 118 can be adjusted for optimal power output.

In some embodiments, reflective surfaces 132 are positioned to direct photons toward at least one corresponding photovoltaic layer 112. In some embodiments, a reflective surface 132 is used to limit the angles within which light flux can enter the photovoltaic unit 110. In some other embodiments, the reflective surface 132 envelops part of the transparent housing 114 to improve light intake. In some embodiments, the reflective surface 132 is stationary and fixed while, in some embodiments, the reflective surface 132 is rotated depending on the position of a light source. In some embodiments, the reflective surface 132 is rotated along an axis of symmetry manually or by a servomotor housed in the support base 130.

In reference to FIG. 4, in some embodiments, the transparent housing 114 is a molded slab. In some embodiments, the molded slab is one or a combination of at least partially hardened polymer(s). In some embodiments, the transparent housing 114 also encloses thermal absorber layers 127 intended to convert thermal energy to electricity and/or store thermal energy in a circulating heat absorbing material. In some embodiments, the thermal absorber layer 127 selectively reflects light within a specific wavelength range.

In some embodiments, the 3D photovoltaic charging system 100 comprises one or a plurality of 3D charging systems 100 mounted on a central 3D charging system 100.

In some embodiments, the transparent housing 114 also encloses a cooling system 128 to lower the operational temperature of photovoltaic layers 112 by a circulating heat absorbing material. In some embodiments, the molded slab is an electric, thermal, and/or humidity insulator.

In some embodiments, the 3D photovoltaic system 100 comprises a photovoltaic unit 110 housed in a collapsible, foldable, telescopic, and/or expandable transparent housing 114. In some embodiments, the support base 130 is a helium gas balloon within which the photovoltaic unit 110 is housed. In some embodiments, the transparent housing 114 has a pattern, such as a dome-shaped or prismatic geometry, for improved light collection and/or enhanced light control.

In some embodiments, a three-dimensional photovoltaic charging system 100 comprising a photovoltaic unit 110 comprising at least one substrate 126 with a serrated surface covered at least partially by a photovoltaic layer 112 configured to convert light to electric current, the serrated surface substrate 126 and the photovoltaic layer 112 having converging surface normals 119, a power management unit 120 comprising a power control unit 122, the power management unit 120 configured to receive and manage the electric current from the photovoltaic layer 112, a support base 130 receiving the photovoltaic unit 110 and the power management unit 120, and an at least partially transparent housing 114 at least partially insulating the photovoltaic layer 112.

In some embodiments, a substrate 126 with a serrated surface covered at least partially by a photovoltaic layer 112 is used to collect and convert light. In some embodiments, 3D photovoltaic charging system 100 comprises a photovoltaic unit 110 having a substrate 126 with a serrated surface covered at least partially by a photovoltaic layer 112, a power management unit 120 having a power control unit 122, and a support base 130 for receiving the photovoltaic unit 110 and the power management unit 120.

The serrated surface substrate 126 and, therefore, the photovoltaic layer 112 covering can have converging surface normals 119. The surface normals oriented at relative angles, i.e., relative surface normal angle 139, ranging between 0 and 180 degrees. Surface normal 119 is defined as a unit vector at any given point P of a surface S that is perpendicular to the tangent plane at P. All surface normals of a planar polygon are parallel, i.e., surface normal relative angle 0 degrees. In contrast, the surface normals of a solid sphere are pointing off in all directions. Two surface normals characterizing two spots on opposite ends of a sphere have a relative angle 180 degrees, i.e., anti-parallel. The orientation of a surface normal indicates the direction the surface faces. In some embodiments, the photovoltaic layers 112 are insulated in a transparent housing 114, and the photovoltaic layers 112 convert light to electric current, whereby the electric current is received and managed by the power management unit 120.

In some embodiments, the parts of the photovoltaic layer 112 with identical surface normals are electrically connected. In some embodiments, the photovoltaic layer 112 is printed on a network of printed conductive surface, i.e., wiring. In some embodiments, the printed wiring is designed to connect parts of the photovoltaic layer 112 with identical surface normals and separate them from other parts with different surface normals. In some embodiments, the power control unit 122 of the power management unit 120 divides and manages different parts of the photovoltaic layer discretely as independent 'zones.'

The term 'serrated surface' herein refers to a plurality of (more than one) indentations cut into and/or created onto a surface. The 'substrate 126 with a serrated surface covered at least partially by a photovoltaic layer 112' does not include solar concentrator panels, wherein photovoltaic layers 112 are positioned inside serrated, concave indentations, where the concentrated light is converted. In the present teachings, the surface normals 119 describing the photovoltaic layer 112, are converging and/or diverging. The photovoltaic surface normals 119 in solar concentrator panels are all parallel, co-planar or relative surface normal angle 139 of zero degrees, all oriented radially toward one or a plurality of concentrator lenses.

The term 'substrate 126 with a serrated surface covered at least partially by a photovoltaic layer 112' can also refer to smooth and uniform surfaces that change structure and geometry due to external stimuli, such as origami solar structures.

In some embodiments, the 'substrate 126 with a serrated surface' supports a thin film photovoltaic layer 112. The thin film photovoltaic layer 112 can be a uniform sprayed-on organic photovoltaic material. In some embodiments, the thin film photovoltaic layer 112 comprises a host of sublayers, including a rear and/or front conductor layer(s) such as transparent conducting oxide, a back contact such as ZnTe, and an absorbent layer such as CdTe. In some embodiments, the thin film photovoltaic layer is coated with an anti-reflective material. In some embodiments, the transparent housing is coated with an anti-reflective material. In some embodiments, the photovoltaic layer is insulated by an encapsulant layer.

In some embodiments, the 3D photovoltaic charging system 100 is stationary with a fixed 'face' direction 143. The 'face' refers to the opening window 129 or aperture through which light enters the system. In some embodiments, the 3D photovoltaic charging system 100 is positioned to permanently 'face' South in the Northern hemisphere, and vice versa.

In reference to FIG. 5, in some embodiments, a photo-tracking, 3D photovoltaic charging system 200, comprising an at least partially transparent housing 114, a photovoltaic unit 110 having a plurality of non-coplanar photovoltaic surfaces 113 configured to convert light to electric current, the plurality of non-coplanar photovoltaic surfaces 113 being at least partially insulated in the at least partially transparent housing 114, a power management unit 120 comprising a power control unit 122, the power management unit 120 configured to receive and manage the electric current from the plurality of non-coplanar photovoltaic surfaces 113, means to cause a change in photo flux, thereby causing a change in the electric current, the change in electric current being monitored by the power control unit 122.

The term 'photo flux' refers to the amount of incident electromagnetic radiation. In some embodiments, a plurality of non-coplanar photovoltaic surfaces 113 converts a fraction of the incident photo flux (electromagnetic energy) to electricity (electrical energy). Some physical parameters determining the fraction of converted energy include radiation frequency, intensity, and incidence angle.

In some embodiments, at least a fraction of the plurality of non-coplanar photovoltaic surfaces 113 changes in orientation causing a change in photo flux. In some embodiments, the change in orientation comprises a change in at least one of relative distance 115 and relative angle 144 between two adjacent layers of the plurality of discrete and non-coplanar photovoltaic layers 112. In some embodiments, the change in photo flux is caused by a change in opening window 137. In some embodiments, the photovoltaic unit 112 comprises at least one substrate 126 with a serrated surface covered at least partially by a photovoltaic layer 112 configured to convert light to electric current, the serrated surface and the photovoltaic layer having converging surface normals 119 oriented at relative angles.

In some embodiments, the 3D photovoltaic charging system 200 can track a light source and comprises a photovoltaic unit 110 having a plurality of non-coplanar photovoltaic surfaces 113 positioned at a relative distance 115 and a relative surface orientation 117. The photovoltaic surfaces 113 are insulated in a transparent housing 114. In some embodiments, 3D photovoltaic charging system 200 can further comprise a power management unit 120 having power control unit 122. In some embodiments, 3D photovoltaic charging system 200 can further comprise a power management unit 120 having power storage unit 124. In some embodiments, 3D photovoltaic charging system 200 can comprise an anchor base 140 positioned at a relative orientation with the photovoltaic unit 110, i.e., relative photovoltaic unit to anchor base orientation 144, wherein the photovoltaic surfaces 113 convert light to electric current and the electric current is received and managed by the power management unit 120, wherein a change in the relative orientation of the photovoltaic unit 110 and the anchor base 140, i.e., relative photovoltaic unit to anchor base orientation 144, causes a change in the electric current due to a change in light flux. The change in electric current is monitored by the power control unit 122, and the anchor base 140 is fixed firmly to an object.

In some embodiments, the relative photovoltaic unit 110 to anchor base 140 orientation 144 is considered the angle between a reference point on the anchor base 140 and the photovoltaic unit 110 'face' direction 143.

In one experiment, the output of the 3D photovoltaic charging system of FIG. 1 was measured at 9 AM on a July day at a fixed South face direction 143. The same embodiment was then rotated manually along its axis and the output was again measured. It was determined that the single-axis rotation of the embodiment to face from fixed at South to directly along the Sun's path, resulted in doubling its output at that time. The improvement was found to be a function of Sun's position in the sky, i.e., time of day.

In some embodiments, 3D photovoltaic charging system 200 is a cylindrical structure rotating along the axis of the cylinder to face the Sun in the sky. In some embodiments, there is a reflective surface 132 connected to the anchor base 140 at least partially enveloping the photovoltaic unit 110. The reflective surface 132 is oriented at a relative orientation with respect to the photovoltaic unit 110. A change in the relative orientation of the reflective surface 132, changes light flux and causes a change in power generated by the photovoltaic unit 110.

The term 'photovoltaic surfaces' in the 'photo-tracking, 3D photovoltaic charging system 200' refers to multi-faceted, non-coplanar photovoltaic surfaces. The term refers to the general concept of three-dimensionally stacked photovoltaics, including:
a) A plurality of discrete and non-coplanar photovoltaic layers 112, having a distance greater than 1 nanometer and a relative angle ranging from 0 to 360 degrees, and
b) A substrate 126 with a serrated surface covered at least partially by a photovoltaic layer 112.

In some embodiments, the power control unit 122 of the photo-tracking, 3D photovoltaic charging system 200 monitors and computes a first maximum power point at a relative photovoltaic unit to anchor base orientation 144. The power control unit 122 then relays a change 142 in the first relative photovoltaic unit to anchor base orientation 144 and computes a second maximum power point. The power control unit 122 continues this process to determine an optimum relative photovoltaic unit to anchor base orientation 144.

In some embodiments, for photo-tracking, the power control unit 122 relays a change 142 in the first relative photovoltaic unit to anchor base orientation 144. In some embodiments, the change is performed by a motor. In some embodiments, the motor is connected to the photovoltaic unit 110 via a support shaft, belt, chain, string, rail, hinge, or piston. In some embodiments, the relative photovoltaic unit to anchor base orientation 144 is changed at a mounting point by a hydraulic piston, spring, or rod.

In some embodiments, the power management unit 120 comprises a power control unit 122. In some embodiments, the power control unit 122 comprises components selected from a list of internet-of-things (IoT) sub-systems, power inverter sub-systems, electric current switches, circuit breakers, resistors, cables, power transformers, active and passive sensors, power transmitters, electric plugs, displays, light-emitting diodes, and power tracking sub-systems. In some embodiments, the power control unit 122 includes an active tracking sub-system, such as a motor. In other embodiments, the power control unit 122 relies on passive tracking sub-systems, such as paraffin wax to act as a hydraulic actuator.

In other embodiments, the power management unit 120 further comprises a power storage unit 124. In some embodiments, the power storage unit 124 is selected from a list of electric, electro-mechanical, electro-chemical, electro-biological, and electro-thermal power storages.

In some embodiments, the 3D photovoltaic charging system 200 comprises a plurality of 3D photovoltaic charging systems 100 mounted on one anchor base 140 with one or a plurality of degrees of freedom, such as a change 142 in the first relative photovoltaic unit to anchor base orientation 144. The anchor base 140 moves one or a plurality of the 3D photovoltaic charging systems 100 for improved power output. In some embodiments, the 3D photovoltaic charging system 200 comprises a plurality of 3D photovoltaic charging systems 100 mounted on a central 3D photovoltaic charging system 100.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A three-dimensional (3D) photovoltaic charging system comprising:
   a tubular housing extending in a longitudinal direction;
   a plurality of discrete photovoltaic layers encased in the tubular housing and spaced apart from each other in the longitudinal direction; and
   a power management unit configured to receive and manage electric current from the plurality of discrete photovoltaic layers,
   wherein each discrete photovoltaic layer is supported within the housing at a location along an outer edge of the respective layer and extends away from said location in the same direction,
   wherein the tubular housing is at least partially transparent about an entire perimeter of the tubular housing such that light from outside the housing can be transmitted through the housing in all directions perpendicular to the longitudinal direction, and
   wherein substantially an entire planar face of each photovoltaic layer lies on the same transverse side of said location.

2. The 3D photovoltaic charging system according to claim 1, wherein the power management unit further comprises a power storage unit.

3. The 3D photovoltaic charging system according to claim 1, wherein at least one of the plurality of discrete photovoltaic layers is at least partially transparent.

4. The 3D photovoltaic charging system according to claim 1, wherein the plurality of discrete photovoltaic layers is at least partially coated with a material selected from the group consisting of dielectric, reflective, anti-reflective, dispersive, diffusive, refractive, and prismatic material.

5. The 3D photovoltaic charging system according to claim 1, wherein at least one layer of the plurality of discrete photovoltaic layers is replaceable.

6. The 3D photovoltaic charging system according to claim 1, wherein the plurality of discrete photovoltaic layers is at least partially encased in a molded dielectric slab.

7. The 3D photovoltaic charging system according to claim 1, wherein a distance between adjacent layers of the plurality of discrete photovoltaic layers is less than or equal to a width of the adjacent layers of the plurality of discrete photovoltaic layers.

8. The 3D photovoltaic charging system according to claim 1, wherein at least one of the plurality of discrete photovoltaic layers is bifacial.

9. The 3D photovoltaic charging system according to claim 1, wherein the plurality of discrete photovoltaic layers is coupled with at least one motor.

10. The 3D photovoltaic charging system according to claim 1, wherein at least one of a distance or an angle between adjacent layers of the plurality of discrete photovoltaic layers is changeable.

11. The 3D photovoltaic charging system according to claim 1, further comprising a support supporting a photovoltaic unit that includes the plurality of discrete photovoltaic layers such that at least one of the support base and the photovoltaic unit is movable relative to the other to change an orientation of the photovoltaic unit relative to the support base.

12. The 3D photovoltaic charging system according to claim 11, wherein a change in the electric current from the photovoltaic unit is monitored by the power management unit.

13. The 3D photovoltaic charging system according to claim 11, wherein the change in the relative orientation of the photovoltaic unit and the support base is relayed by the power management unit.

14. The 3D photovoltaic charging system according to claim 1, wherein an angle between adjacent layers of the plurality of discrete photovoltaic layers is a permanently-fixed angle.

15. The 3D photovoltaic charging system according to claim 1, wherein the discrete photovoltaic layers are non-coplanar.

16. The 3D photovoltaic charging system according to claim 1, wherein a distance between adjacent layers of the plurality of discrete photovoltaic layers is uniform among the plurality of discrete photovoltaic layers.

17. The 3D photovoltaic charging system according to claim 1, wherein each of the plurality of discrete photovoltaic layers permanently faces a same direction.

18. The 3D photovoltaic charging system according to claim 1, further comprising a longitudinally extending electric conduit, the power management unit receiving electric current from the plurality of discrete photovoltaic layers via the electrical conduit.

19. The 3D photovoltaic charging system according to claim 18, wherein the electric conduit is located along said outer edge of each photovoltaic layer.

20. The 3D photovoltaic charging system according to claim 18, further comprising a photovoltaic unit installed on a support base, wherein the photovoltaic unit includes the plurality of discrete photovoltaic layers, and the electric conduit is the support base.

* * * * *